Dec. 4, 1928.
E. A. NELSON
COVER FOR TIRE VALVE APERTURES
1,693,859
Filed April 6, 1926
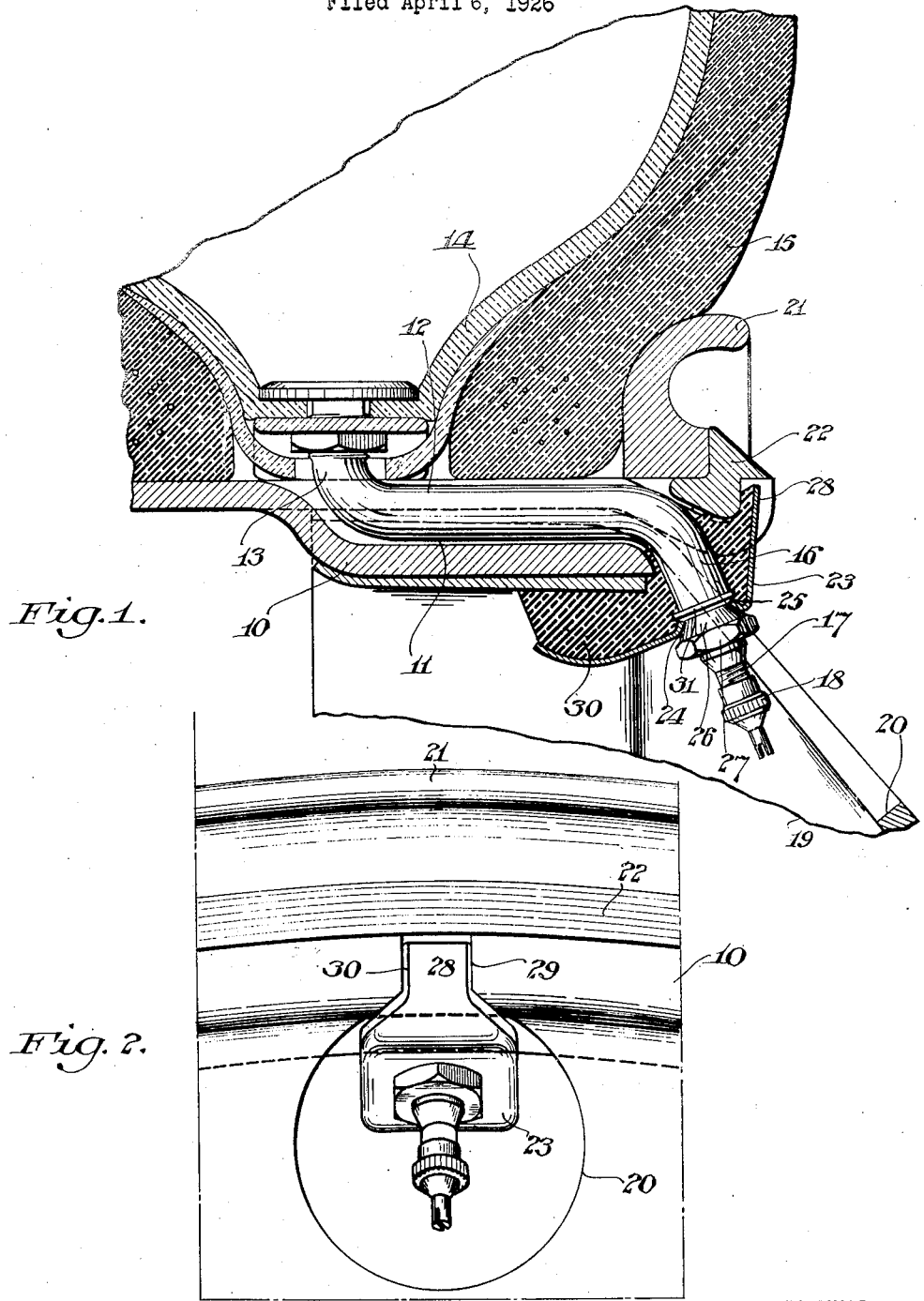
INVENTOR.
Emil A. Nelson,
BY
his ATTORNEY.

Patented Dec. 4, 1928.

1,693,859

UNITED STATES PATENT OFFICE.

EMIL A. NELSON, OF ROSEVILLE, MICHIGAN, ASSIGNOR TO BUDD WHEEL COMPANY, OF PHILADELPHIA, PENNSYLVANIA, A CORPORATION OF PENNSYLVANIA.

COVER FOR TIRE-VALVE APERTURES.

Application filed April 6, 1926. Serial No. 100,014.

My invention relates to attachments for valve stems of pneumatic tires.

The valve stem of a pneumatic tire for disc wheels is often bent at substantially a right angle to project laterally adjacent an edge of the wheel rim, such laterally extended portion of the valve stem being seated or fitted in a transverse groove or depression formed on the periphery of the rim. This transverse groove or depression is open at one end and the valve stem at said open end is bent or curved inwardly toward the hub of the wheel. Thus formed, the valve stem is readily accessible.

An object of the present invention is to provide an attachment for the above type valve stem which will securely hold the extended end thereof in fixed relation to the wheel, and will, at the same time, provide a closure for the open end of the transverse groove or depression within which the valve stem is seated.

A further object of the invention is to so form the attachment or closure as to admit of its ready attachment or detachment as desired, said closure being formed in part of rubber or the like whereby yielding contact between it and the wheel rim is provided.

Other objects and advantages of the invention will be hereinafter pointed out.

In the drawings, wherein like reference characters denote like or corresponding parts.

Fig. 1 is a transverse section thru the peripheral portion of a disc wheel showing the valve stem in elevation and a partial section of the tire, and Fig. 2 is a side elevation of that portion of the wheel illustrated in Fig. 1.

In the embodiment of the invention selected for illustration the rim or felly of the wheel is designated in its entirety as 10. Said rim, on its periphery, is provided with a transverse groove or depression 11 terminating in an angular opening at one end and merging with a slot 29 formed in the gutter 30 as indicated in Fig. 1. The walls of the slot are in continuation of the side walls of the grooves. Within said groove or depression the transversely extended portion 12 of the valve stem is fitted. At its inner end said valve stem is bent or curved upwardly as at 13 to engage the inner tube 14 of the tire 15 mounted on the wheel or rim. At its opposite end it (the valve stem) is bent or curved downwardly as at 16 toward the center of the wheel, such projecting or downwardly extending portions being exteriorly threaded as at 17 to accommodate at its outer end the usual valve cap 18. Preferably the disc portion 19 of the wheel, in the vicinity of the projecting end of the valve stem is provided with an opening 20 to permit ready access to said stem.

Any suitable means may be provided to fasten the tire 15 upon said rim. As herein shown, a demountable ring 21 and a split lock-ring 22 are provided. Any other type of fastening, if desired, may be used; also, if desired, the character of valve stem herein shown may be made a part of a vehicle wheel other than a wheel of the disc type.

Upon the inwardly extended outer end of the valve stem a substantially dish-shaped metal cap 23 is mounted, said cap having formed therein an opening 24 through which the valve stem is carried. Around said opening 24 the cap 23 is reinforced by an inwardly extending annular flange 25 so formed in said cap as to provide therein an inwardly tapering annular depression within which a correspondingly shaped extension 26 of a lock-nut 27 is adapted to be seated. On its periphery, said cap 23 is provided with a tongue or projecting portion 28 which is intended to loosely fit a slot 29 formed in the edge of the rim 10 and laterally aligned with the groove or depression 11. The purpose of this tongue and slot engagement is to prevent rotational movement of the cap 23 when fitted, and to cover and coact with that portion of the packing overlying the ring 22.

On its concave face the cap 23 and its tongue 28 is provided with a filler 30 of rubber or other yielding packing material adapted as shown to fill all interstices. This filler, as the cap is forced inwardly toward the wheel rim, bears directly upon said rim and the lock-ring throughout to provide at the projecting end of the valve stem a complete closure for the open end of the transverse groove or depression 11, the lock-nut 27, by its engagement with the threads 17 of the valve stem tending to hold said filler in firm yielding contact as indicated, thereby sealing the transverse aperture in the rim from which the valve stem extends. An annular flange 31 formed upon the valve stem limits the inward movement of the cap.

A valve stem attachment characterized as above set forth is advantageous in that it firmly holds at all times the valve stem against movement relatively to the wheel. It is further advantageous in that it provides at the same time a complete closure for the open end of the transverse groove or depression within which the valve stem is seated. All dirt, mud, water, and other road particles are thus prevented from entering the groove or depression so long as the cap 23 is fastened in place.

While I have described my invention in detail in its present preferred embodiment, it will be obvious to those skilled in the art after understanding my invention that various changes and modifications may be made therein without departing from the spirit or scope thereof. I aim in the appended claim to cover all such modifications and changes.

What I claim is:

The combination with a vehicle wheel including a wheel rim or felly having a gutter, a transversely extending depression in the rim terminating in a transverse slot in the gutter, a valve stem seated in the depression and projecting therefrom below the gutter, a locking ring in the gutter, a sealing washer surrounding the stem, and packed with a substance which fills the irregular interstices between the stem and the angularly related surface walls which surround it, and a washer clamping means on the stem.

In testimony whereof he hereunto affixes his signature.

EMIL A. NELSON